US012691414B2

(12) United States Patent (10) Patent No.: US 12,691,414 B2
Ito et al. (45) Date of Patent: Jul. 28, 2026

(54) PARTICULATE FILTER

(71) Applicant: Cataler Corporation, Kakegawa (JP)

(72) Inventors: Masaya Ito, Kakegawa (JP); Ryota Onoe, Kakegawa (JP); Ryo Tasaki, Kakegawa (JP); Momoko Iwai, Kakegawa (JP); Yamato Matsushita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 319 days.

(21) Appl. No.: 18/567,809

(22) PCT Filed: Jun. 10, 2022

(86) PCT No.: PCT/JP2022/023453
§ 371 (c)(1),
(2) Date: Dec. 7, 2023

(87) PCT Pub. No.: WO2022/264935
PCT Pub. Date: Dec. 22, 2022

(65) Prior Publication Data
US 2024/0269614 A1 Aug. 15, 2024

(30) Foreign Application Priority Data
Jun. 17, 2021 (JP) ................................ 2021-100551

(51) Int. Cl.
B01D 53/94 (2006.01)
B01J 35/56 (2024.01)
(Continued)

(52) U.S. Cl.
CPC .......... B01D 53/9454 (2013.01); B01J 35/56 (2024.01); F01N 3/035 (2013.01); F01N 3/28 (2013.01);
(Continued)

(58) Field of Classification Search
CPC ........ B01D 53/9454; B01D 2255/1025; B01D 2255/9155; B01D 2255/407;
(Continued)

(56) References Cited

U.S. PATENT DOCUMENTS

2006/0008396 A1* 1/2006 Wursthorn .............. F01N 3/035
422/177
2007/0028604 A1 2/2007 Twigg et al.
(Continued)

FOREIGN PATENT DOCUMENTS

CN 110314455 A 10/2019
JP 2003-154223 A 5/2003
(Continued)

OTHER PUBLICATIONS

Translation of International Preliminary Report on Patentability in PCT Application No. PCT/JP2022/023453, mailed Dec. 14, 2023, 6 pages.
(Continued)

*Primary Examiner* — Madeline Gonzalez
(74) *Attorney, Agent, or Firm* — J. Robin Rohlicek

(57) ABSTRACT
According to the present invention, a wall-flow type particulate filter in which pressure loss is suppressed despite a large formation region of a catalyst layer is provided. The particulate filter disclosed herein includes a wall-flow type base material and a catalyst layer formed on the base material. The base material includes an inlet side cell whose only end part on an exhaust gas entry side is open, an outlet side cell whose only end part on an exhaust gas exit side is open, and a partition wall that sections between the inlet side cell and the outlet side cell and includes a plurality of pores communicating between the inlet side cell and the outlet side cell. A first catalyst layer is formed on a surface of the partition wall that is in contact with the inlet side cell. The
(Continued)

first catalyst layer is provided in a region over 80% of a total length of the base material from an end part of the base material on the exhaust gas entry side toward an end part thereof on the exhaust gas exit side. In at least a region from a position corresponding to 20% of the total length of the base material to a position corresponding to 80% thereof, from the end part of the base material on the exhaust gas entry side, the first catalyst layer is inclined so that a thickness of the first catalyst layer decreases from the end part on the exhaust gas entry side toward the end part on the exhaust gas exit side.

5 Claims, 4 Drawing Sheets

(51) Int. Cl.
  *F01N 3/035*          (2006.01)
  *F01N 3/28*           (2006.01)
(52) U.S. Cl.
  CPC ................ *B01D 2255/1025* (2013.01); *B01D 2255/9155* (2013.01); *F01N 2370/02* (2013.01); *F01N 2510/0684* (2013.01)
(58) Field of Classification Search
  CPC . B01D 2255/908; B01J 35/56; B01J 37/0244; B01J 37/0248; B01J 23/63; F01N 3/035; F01N 3/28; F01N 2370/02; F01N 2510/0684; F01N 2330/00; F01N 2330/30; F01N 2510/0682; F01N 3/0222; Y02T 10/12

USPC ...... 210/348, 188; 60/288, 299; 55/DIG. 30, 55/523; 422/177, 168, 180
  See application file for complete search history.

(56)          References Cited

U.S. PATENT DOCUMENTS

| | | | |
|---|---|---|---|
| 2015/0059321 A1 | 3/2015 | Nakayama et al. | |
| 2016/0375429 A1 | 12/2016 | Chandler et al. | |
| 2019/0301325 A1 | 10/2019 | Yoshioka et al. | |
| 2019/0301327 A1 | 10/2019 | Yoshioka et al. | |
| 2020/0276567 A1 | 9/2020 | Onoe et al. | |
| 2022/0412244 A1 | 12/2022 | Iwata et al. | |

FOREIGN PATENT DOCUMENTS

| | | | |
|---|---|---|---|
| JP | 2006-502842 A | 1/2006 | |
| JP | 2011212508 A | 10/2011 | |
| JP | 2014113570 A | 6/2014 | |
| JP | 2018-537265 A | 12/2018 | |
| JP | 2019177318 A | 10/2019 | |
| JP | 2021-3678 A | 1/2021 | |
| WO | 2013/145266 A1 | 10/2013 | |
| WO | 2017056067 A1 | 4/2017 | |

OTHER PUBLICATIONS

Extended European Search Report in EP Application No. 22824925.6, mailed Jul. 17, 2024, 7 pages.
First Office Action, Chinese Application No. 202280042960.7, mailed May 29, 2026 (13 pages).

* cited by examiner

PARTICULATE FILTER

CROSS REFERENCE TO RELATED APPLICATIONS

This application is a national phase under 35 USC 371 of International Application No. PCT/JP2022/023453, filed Jun. 10, 2022, which claims the benefit of the filing date of Japanese Application No. 2021-100551, filed Jun. 17, 2021, the contents of all of which are hereby incorporated by reference in their entireties.

TECHNICAL FIELD

The present invention relates to a particulate filter that is disposed in an exhaust system of an internal-combustion engine. Specifically, the present invention relates to a particulate filter including a wall-flow type base material and a catalyst layer formed on the base material. This application claims the benefit of priority to Japanese Patent Application No. 2021-100551 filed on Jun. 17, 2021, the entire contents of which application are incorporated herein by reference.

BACKGROUND ART

The exhaust gas emitted from an internal-combustion engine such as an engine for automobiles includes toxic gas substances such as hydrocarbon (HC), carbon monoxide (CO), and nitrogen oxide (NO$_x$); particulate matter (PM); and the like. For this reason, an exhaust system of the internal-combustion engine includes a particulate filter for capturing the PM and purifying the toxic gas substances described above.

A typical example of the particulate filter includes a wall-flow type base material and a catalyst layer formed on the base material. The wall-flow type base material includes an inlet side cell whose only end part on an exhaust gas entry side is open, an outlet side cell whose only end part on an exhaust gas exit side is open, and a porous partition wall that sections between both cells. On the partition wall of the base material, the catalyst layer is formed. The exhaust gas supplied to the particulate filter with such a structure enters the inlet side cell, passes the partition wall, and then is emitted from the outlet side cell. Here, the PM is captured in the porous partition wall and additionally, the toxic gas substance is purified by the catalyst layer formed on the partition wall.

Patent Literature 1 is cited as the conventional technical literature related to the above wall-flow type particulate filter, for example. Patent Literature 1 discloses a honeycomb filter in which a catalyst layer containing a platinum group element is disposed only on an inner surface side of a partition wall that surrounds an inlet side cell, and in which the catalyst layer containing the platinum group element is disposed in the range from an end part of a base material on an exhaust gas entry side to at least 35% of the total length of the cell and is not disposed in the range from an end part of the base material on an exhaust gas exit side to at least 30% of the total length of the cell.

CITATION LIST

Patent Literature

Patent Literature 1 Japanese Patent Application Publication No. 2019-177318

SUMMARY OF INVENTION

Problem to be Solved by Invention

The wall-flow type particulate filter is required to be excellent in both pressure loss suppressing performance and toxic gas purifying performance. In the wall-flow type particulate filter, however, the pressure loss suppressing performance and the toxic gas purifying performance are in the trade-off relationship. Specifically, increasing a formation region of the catalyst layer can increase the toxic gas purifying performance but also increases the pressure loss due to the capture of the PM. This is also shown in the results in Table 2 in Patent Literature 1, and in the conventional art according to Patent Literature 1, in the case where the formation region of the catalyst layer is large, particularly in a case where the catalyst layer is formed in a region over 80% of the total length of the base material, the suppression of the pressure loss is insufficient.

The present invention has been made in order to solve the above problem, and an object is to provide a wall-flow type particulate filter in which pressure loss is suppressed despite a large formation region of a catalyst layer.

Solution to Problem

In order to achieve the above object, a particulate filter with the following structure is provided by the present invention.

A particulate filter disclosed herein includes a wall-flow type base material and a catalyst layer formed on the base material. The base material includes an inlet side cell whose only end part on an exhaust gas entry side is open, an outlet side cell whose only end part on an exhaust gas exit side is open, and a partition wall that sections between the inlet side cell and the outlet side cell and includes a plurality of pores communicating between the inlet side cell and the outlet side cell. A first catalyst layer is formed on a surface of the partition wall that is in contact with the inlet side cell. The first catalyst layer is provided in a region over 80% of a total length of the base material from an end part of the base material on the exhaust gas entry side toward an end part thereof on the exhaust gas exit side. In at least a region from a position corresponding to 20% of the total length of the base material to a position corresponding to 80% thereof, from the end part of the base material on the exhaust gas entry side, the first catalyst layer is inclined so that the thickness of the first catalyst layer decreases.

In such a structure, the thickness of the first catalyst layer is small in a downstream part of the inlet side cell of the base material: thus, the exhaust gas easily passes the partition wall on the downstream part side of the inlet side cell of the base material. As a result, the pressure of the exhaust gas on the downstream part side of the inlet side cell of the base material decreases and the exhaust gas entry speed of the PM into the partition wall decreases: thus, deep layer deposition of the PM can be suppressed. Thus, the pressure loss of the particulate filter can be reduced despite a large formation region of the catalyst layer.

In a preferred aspect of the particulate filter disclosed herein, a ratio (D20/D80) of a thickness (D20) of the catalyst layer at the position corresponding to 20% of the total length of the base material from the end part of the base material on the exhaust gas entry side to a thickness (D80) of the catalyst layer at the position corresponding to 80% of the total length of the base material from the end part of the base material on the exhaust gas entry side is 2 or more and 4 or less. By such a structure, the effect of reducing the pressure loss of the particulate filter becomes particularly high.

In a preferred aspect of the particulate filter disclosed herein, the thickness (D80) of the catalyst layer at the position corresponding to 80% of the total length of the base material from the end part of the base material on the exhaust gas entry side is 11 µm or more and 25 µm or less. By such a structure, the effect of reducing the pressure loss of the particulate filter becomes particularly high.

In a preferred aspect of the particulate filter disclosed herein, a second catalyst layer is formed on a wall surface of the pore in a predetermined region from a surface of the partition wall that is in contact with the outlet side cell toward the inlet side cell, and a catalyst non-formation region where the catalyst layer is not formed substantially is provided between the first catalyst layer and a formation region of the second catalyst layer in a thickness direction of the partition wall.

In such a structure, the catalyst non-formation region exists below the first catalyst layer and in the catalyst non-formation region, the pores remain in a state of not being narrowed by the catalyst layer. Therefore, the PM can be captured sufficiently in the first catalyst layer and the catalyst non-formation region, and the arrival of the PM at the formation region of the second catalyst layer where the pores are narrowed due to the catalyst layer can be prevented. Thus, the sudden increase of the pressure loss due to the closing of the pores in the formation region of the second catalyst layer can be prevented. Additionally, in such a structure, the second catalyst layer is not easily covered with the PM. Therefore, the contact frequency between the second catalyst layer and the exhaust gas can be secured sufficiently and the high toxic gas purifying performance can be exerted. That is to say, in such a structure, both the toxic gas purifying performance and the pressure loss suppressing performance can be achieved at a higher level.

In a preferred aspect of the particulate filter disclosed herein, the first and second catalyst layers contain a three-way catalyst that oxidizes CO and HC and reduces $NO_x$, and a carrier that carries the three-way catalyst. By using the three-way catalyst as the catalyst of the catalyst layer, each of the toxic gas substances, CO, HC, and $NO_x$, can be purified efficiently:

In the aspect containing the three-way catalyst, the three-way catalyst preferably contains at least one kind selected from the group consisting of Pt, Pd, and Rh. By using these as the three-way catalyst, the toxic gas purifying performance can be improved more suitably.

DESCRIPTION OF EMBODIMENTS

Figure 1:
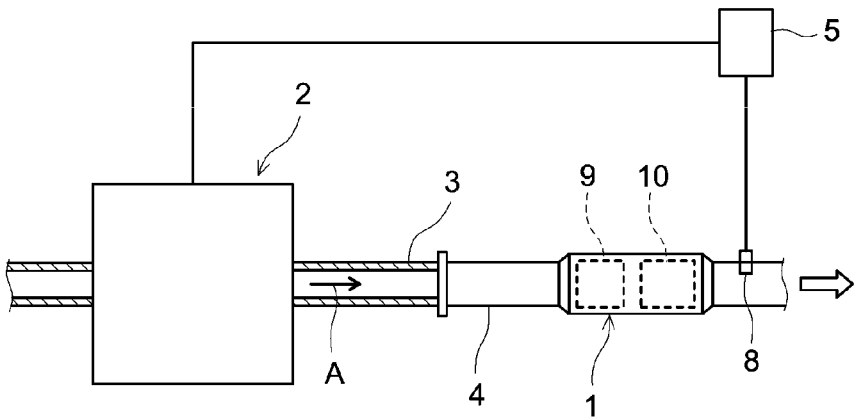
FIG. 1 is a diagram schematically illustrating an exhaust system of an internal-combustion engine where an exhaust gas purifying device is disposed.

Embodiments of the present invention are hereinafter described with reference to the drawings. Note that in the drawings below, the members and parts with the same operation are denoted by the same reference sign and the overlapping description may be omitted or simplified. The dimensional relationship (length, width, thickness, and the like) in each drawing does not always reflect the actual dimensional relationship. Note that matters other than matters particularly mentioned in the present specification and necessary for the implementation of the present invention (for example, the general matter related to the installation of a particulate filter in an exhaust system, and the like) can be grasped as design matters of those skilled in the art based on the prior art in the relevant field. The present invention can be implemented on the basis of the disclosure of the present specification and common technical knowledge in the relevant field.

<Exhaust Gas Purifying Device>

First, an exhaust gas purifying device including a particulate filter according to one embodiment of the present invention is described. FIG. 1 is a diagram schematically illustrating an exhaust system of an internal-combustion engine where the exhaust gas purifying device is disposed. Note that an arrow A in FIG. 1 indicates the flow of exhaust gas. For the convenience of description, in this specification, a direction from which the exhaust gas is supplied is referred to as "upstream" and a direction to which the exhaust gas is emitted is referred to as "downstream".

An exhaust gas purifying device 1 is provided to an exhaust system of an internal combustion engine (engine) 2. To the internal combustion engine 2, a mixed gas including oxygen and a fuel gas is supplied. The internal combustion engine 2 combusts this mixed gas and converts combustion energy into mechanical energy: In one example, the internal-combustion engine 2 is formed mainly by a gasoline engine. Note that the internal-combustion engine 2 may be an engine other than the gasoline engine (for example, diesel engine or the like).

The mixed gas combusted in the internal combustion engine 2 turns into exhaust gas and is emitted to the exhaust system. In the exhaust system of the internal combustion engine 2, an exhaust manifold 3, an exhaust pipe 4, and the exhaust gas purifying device 1 are provided in this order from the upstream side. The exhaust gas purifying device 1 purifies toxic gas substances (CO, HC, $NO_x$) included in the exhaust gas emitted from the internal combustion engine 2 and additionally captures and removes PM.

Specifically; the exhaust gas purifying device 1 is connected to an exhaust port (not shown) of the internal-combustion engine 2 through the exhaust manifold 3 and the exhaust pipe 4. Moreover, the exhaust gas purifying device illustrated in FIG. 1 includes a temperature increase catalyst 9. The temperature increase catalyst 9 has a function of increasing the temperature of the exhaust gas. A specific structure of the temperature increase catalyst 9 is not described in detail here because this structure does not characterize the art disclosed herein. In addition, the temperature increase catalyst 9 is not an essential component of the exhaust gas purifying device 1 and may be omitted.

Note that a pressure sensor 8 is disposed on the downstream side of the exhaust gas purifying device 1 in the exhaust system of the internal-combustion engine 2 illustrated in FIG. 1. This pressure sensor 8 is connected to an engine control unit (ECU) 5. The ECU 5 is a control unit that controls the operation of the internal-combustion engine 2. The ECU 5 may include a central processing unit (CPU) that executes an instruction of a control program, a read only memory (ROM) that stores the control program to be executed by the CPU, a random access memory (RAM) that is used as a working area where the control program is developed, and a storage device (recording medium) such as a memory that stores various kinds of information. For example, the ECU 5 uses a pressure loss value detected by the pressure sensor 8 as one piece of information when controlling the operation of the internal-combustion engine 2.

A particulate filter 10 according to this embodiment is disposed inside the exhaust gas purifying device 1 (typically; on the downstream side of the temperature increase catalyst 9). By this particulate filter 10, the PM is removed and the toxic gas substance is purified. A specific structure of the particulate filter 10 according to this embodiment is described below.

<Particulate Filter>

Figure 2:
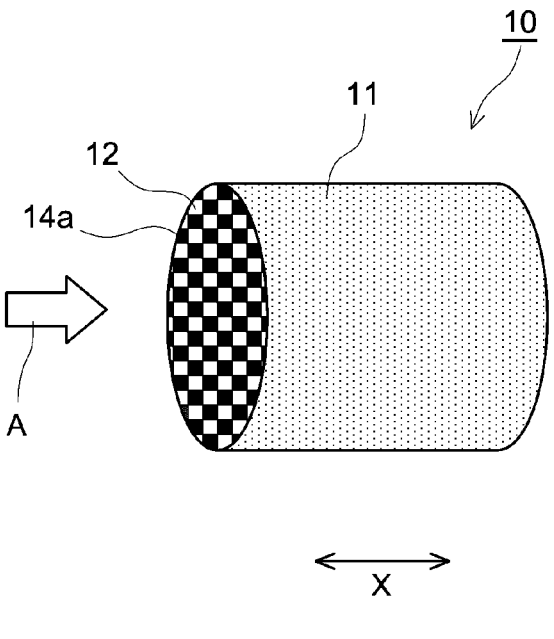
FIG. 2 is a perspective view schematically illustrating a particulate filter according to one embodiment of the present invention.
Figure 3:
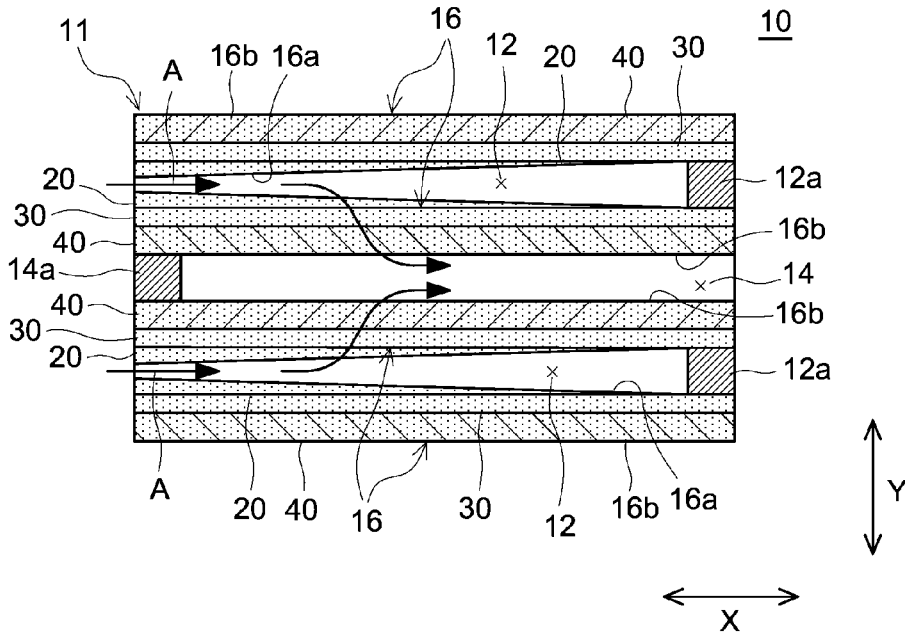
FIG. 3 is a diagram schematically illustrating a cross section along a cylinder axis direction of the particulate filter according to one embodiment of the present invention.
Figure 4:
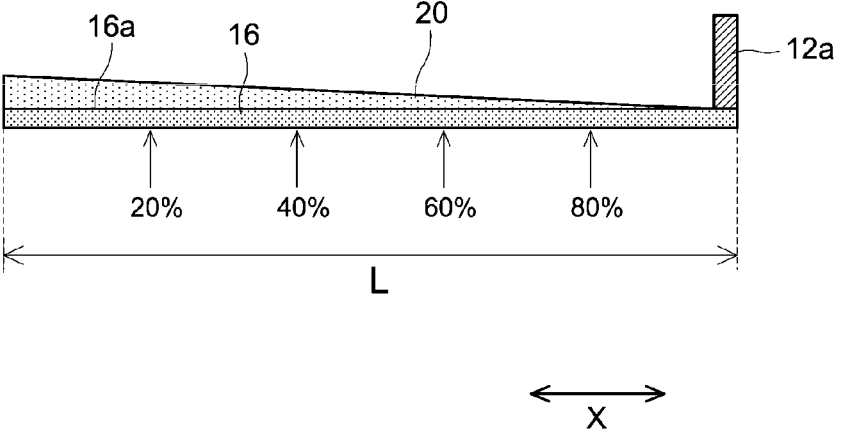
FIG. 4 is a diagram schematically illustrating a cross section of a first catalyst layer of the particulate filter according to one embodiment of the present invention.
Figure 5:
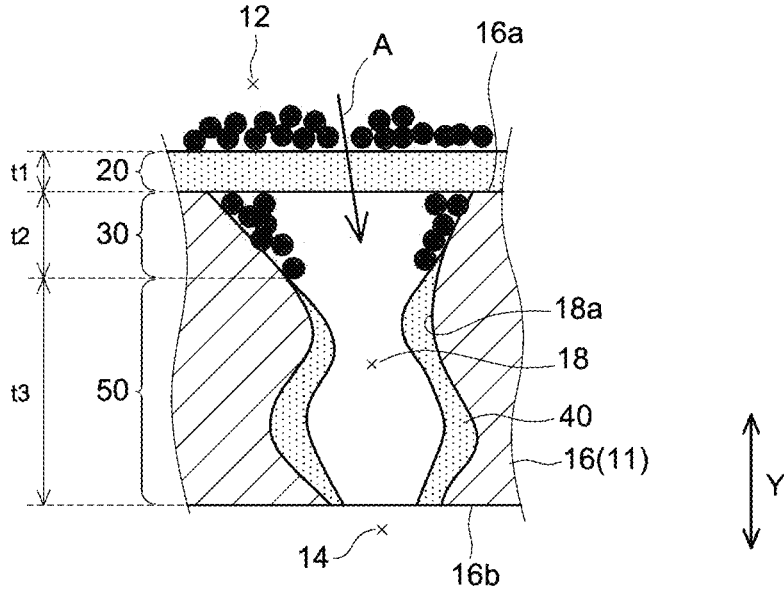
FIG. 5 is a magnified cross-sectional view schematically illustrating a cross section of a partition wall of a base material of the particulate filter according to one embodiment of the present invention.

FIG. 2 is a perspective view schematically illustrating the particulate filter according to this embodiment. FIG. 3 is a diagram schematically illustrating a cross section along a cylinder axis direction of the particulate filter according to this embodiment. FIG. 4 is a diagram schematically illustrating a cross section of a first catalyst layer of the particulate filter according to this embodiment. FIG. 5 is a magnified cross-sectional view schematically illustrating a cross section of a partition wall of a base material of the particulate filter according to this embodiment. Noted that similarly to FIG. 1, the arrow A in each of FIG. 2 to FIG. 5 indicates the flow of the exhaust gas. Moreover, in FIG. 2 to FIG. 5, reference sign X denotes "an extending direction of the partition wall", and reference sign Y denotes "a thickness direction of the partition wall of the base material".

As illustrated in FIG. 2 to FIG. 5, the particulate filter 10 according to this embodiment includes a wall-flow type base material 11, and a first catalyst layer 20 formed on the base material 11.

1. Base Material

The base material 11 forms a frame of the particulate filter 10. As illustrated in FIG. 2, the base material 11 used in this embodiment has a cylindrical shape. Noted that the outer shape of the base material is not limited in particular and may be an elliptical tubular shape, a polygonal tubular shape, or the like. Additionally, the total length and the volume of the base material 11 are not limited in particular and can be changed as appropriate depending on the performance of the internal combustion engine 2 (see FIG. 1) and the like. Various materials that have conventionally been employed in this type of applications can be used as appropriate for the base material 11. For example, the material of the base material 11 may be a material with high heat resistance typified by ceramic such as cordierite, aluminum titanate, or silicon carbide (SiC), or alloy such as stainless steel.

The base material 11 in the present embodiment is a wall-flow type base material. Specifically, as illustrated in FIG. 2 and FIG. 3, the base material 11 includes an inlet side cell 12 whose only end part on an exhaust gas entry side is open, an outlet side cell 14 whose only end part on an exhaust gas exit side is open, and a porous partition wall 16 that sections between the inlet side cell 12 and the outlet side cell 14. Specifically, the inlet side cell 12 is a gas flow channel whose end part on the exhaust gas entry side is open and whose end part on the exhaust gas exit side is closed by a sealing part 12a. On the other hand, the outlet side cell 14 is a gas flow channel whose end part on the exhaust gas entry side is closed by a sealing part 14a and whose end part on the exhaust gas exit side is open. The partition wall 16 is a partition material including a plurality of pores through which the exhaust gas can pass. This partition wall 16 includes a plurality of pores 18 (see FIG. 5) that communicate between the inlet side cell 12 and the outlet side cell 14. Note that in the particulate filter 10 according to this embodiment, the shape of the inlet side cell 12 (and outlet side cell 14) at a cross section perpendicular to the extending direction X of the partition wall 16 is a square (see FIG. 1). However, the shape of the inlet side cell (and outlet side cell) at the cross section perpendicular to the extending direction is not limited to a square and may be various shapes. For example, the shape may be a rectangular shape such as a parallelogram, a rectangle, or a trapezoid, a triangular shape, another polygonal shape (such as a hexagon or an octagon), a circular shape, or other various geometric shapes.

Note that the partition wall 16 of the base material 11 is formed preferably in consideration of the PM capturing performance, the pressure loss suppressing performance, or the like. For example, the partition wall 16 has a thickness of preferably about 25 μm to 100 μm. Additionally; the partition wall 16 has a porosity of preferably about 20 vol % to 70 vol %, and more preferably 50 vol % to 70 vol %. From the viewpoint of securing the air permeation of the partition wall 16 sufficiently to suppress the increase in pressure loss, the average pore diameter of the pores 18 is preferably 8 μm or more, more preferably 12 μm or more, and still more preferably 15 μm or more. On the other hand, from the viewpoint of securing the suitable PM capturing performance, the upper limit value of the average pore diameter of the pores 18 is preferably 30 μm or less, more preferably 25 μm or less, and still more preferably 20 μm or less. Note that the porosity and the average pore diameter of the partition wall 16 are the values measured by mercury porosimetry.

2. First Catalyst Layer

As illustrated in FIG. 3 to FIG. 5, the first catalyst layer 20 is formed on an entry side surface 16a of the partition wall 16 of the base material 11. The entry side surface 16a is a surface in contact with the inlet side cell 12, and corresponds to a surface of the partition wall 16 (that is, outer surface) that is exposed inside the inlet side cell 12 in a state where the catalyst layer 20 is not formed on the base material 11.

The first catalyst layer 20 is a porous layer containing a catalyst. Opening parts of the pores 18 of the partition wall 16 on the inlet side cell 12 side are covered with the first catalyst layer 20. Therefore, the PM in the exhaust gas are mostly captured in the inlet side cell 12 on the upstream side of the first catalyst layer 20 before entering the pores 18. Thus, it is possible to prevent a large amount of PM from being deposited inside the pores and closing the pores 18.

In the case of a particulate filter not having a catalyst layer on the entry side surface of the partition wall of the base material, the PM is captured in the pore of the partition wall.

Therefore, as the amount of deposited PM increases, more pores of the partition wall are closed, resulting in the sudden increase in pressure loss. If the amount of deposited PM increases further, the inside of the partition wall is filled with the PM and the PM starts to be deposited on the surface of the partition wall and the rise of the pressure loss becomes gradual.

On the other hand, in this embodiment, the PM in the exhaust gas is mostly captured on the surface of the partition wall: therefore, even if the amount of deposited PM increases, the PM does not enter the pore 18 of the partition wall 16 and the rise of the pressure loss can be made gradual.

The kind of catalyst contained in the first catalyst layer 20 is not limited in particular and known catalysts that are used for the particulate filter may be employed. Specifically, a three-way catalyst, an SCR catalyst, an NSR catalyst, a catalyst combining these, or the like may be used.

The first catalyst layer 20 is formed by; for example, an aggregation of composite particles in which a catalyst metal is carried by a carrier. Preferably, the first catalyst layer 20 includes a three-way catalyst and a carrier that carries the three-way catalyst. The three-way catalyst refers to a catalyst metal that oxidizes CO and HC and reduces $NO_x$ in the exhaust gas. By the formation of the first catalyst layer 20 including such a three-way catalyst, the toxic gas substances in the exhaust gas can be purified efficiently: Examples of the three-way catalyst include particles including mainly a platinum group element such as platinum (Pt), palladium (Pd), rhodium (Rh), ruthenium (Ru), osmium (Os), and iridium (Ir). Noted that among these platinum group elements, Pt, Pd, and Rh can exert the particularly suitable toxic gas purifying performance because of having high oxidizing activity.

From the viewpoint of improving the toxic gas purifying performance, the content of the three-way catalyst per liter of the volume of the base material 11 is preferably 0.1 g/L or more, more preferably 0.5 g/L or more, and particularly preferably 1 g/L or more. On the other hand, from the viewpoint of reducing the material cost, the content of the three-way catalyst is preferably 10 g/L or less, more preferably 7.5 g/L or less, and particularly preferably 5 g/L or less. Note that the base material 11 may contain a catalyst layer other than the first catalyst layer 20 (for example, a second catalyst layer 40 to be described below). Therefore, "the content of the three-way catalyst per liter of the volume of the base material 11" corresponds to the total content in the first catalyst layer 20 and another catalyst layer formed optionally per liter of the volume of the base material 11.

On the other hand, a metal oxide is preferably used for the carrier that carries the catalyst metal. Examples of such a metal oxide include alumina ($Al_2O_3$), ceria ($CeO_2$), zirconia ($ZrO_2$), silica ($SiO_2$), titania ($TiO_2$), and the like. These metal oxides can efficiently exert the toxic gas purifying performance by the catalyst metal (typically; three-way catalyst) because of having large specific surface area and high durability (heat resistance in particular).

The first catalyst layer 20 may contain another additive. Examples of such an additive include an OSC material. The OSC material refers to a material that has oxygen storage capacity (OSC) and stores and releases oxygen. By the addition of this OSC material, the exhaust gas atmosphere in contact with the catalyst layer 20 can be kept close to be stoichiometric (theoretical air-fuel ratio) stably: therefore, the catalyst action of the three-way catalyst can be stabilized. Examples of such an OSC material include ceria-zirconia composite oxide and the like. Examples of other additives than the OSC material include a $NO_x$ absorber with a $NO_x$ absorbing capability, a stabilizer, and the like. Furthermore, the first catalyst layer 20 may contain a very small amount of components derived from a raw material and a manufacturing process. For example, the first catalyst layer 20 may include one kind, or two or more kinds of oxide, sulfate, carbonate, nitrate, and chloride of alkaline earth metal (such as Be, Mg, Ca, or Ba), rare earth metal (such as Y, La, or Ce), alkali metal (such as Li, Na, or K), and transition metal (such as Mn, Fe, Co, or Ni).

The first catalyst layer 20 is preferably formed by composite particles with the particle diameter smaller than the pore 18 of the partition wall 16. Specifically, the average particle diameter of the composite particles included in the first catalyst layer 20 is preferably 5 µm or less, more preferably 2.5 µm or less, and still more preferably 2 µm or less, and is about 1 µm, for example. By using such fine particles, the entry of the PM into the pores 18 can be prevented for sure. The lower limit value of the average particle diameter of the composite particles is not limited in particular and may be 0.01 µm or more, 0.05 µm or more, 0.1 µm or more, or 0.5 µm or more. Noted that in this specification, "the average particle diameter" refers to a cumulative 50% particle diameter (D50) in a particle size distribution based on the volume, which is measured using a particle size distribution measurement apparatus based on a laser diffraction/scattering method. Specifically; the average particle diameter may be the value measured using a laser diffraction/scattering type particle size distribution analyzer (manufactured by Horiba Ltd., LA-920) with a refractive index set to 1.20+0.01i (i is an imaginary term). Here, the term "primary particles" refers to fine particles gathered to form a secondary particle by aggregating, sintering, or the like.

In the particulate filter 10 according to this embodiment, the formation amount of the catalyst layer per liter of the volume of the base material 11 is preferably 20 g/L or more, more preferably 30 g/L or more, and still more preferably 50 g/L or more from the viewpoint of improving the toxic gas purifying performance. On the other hand, the upper limit value of the formation amount of the catalyst layer is preferably 200 g/L or less, more preferably 150 g/L or less, and still more preferably 120 g/L or less from the viewpoint of improving the pressure loss suppressing performance. Note that, as described above, the base material 11 may include other catalyst layer than the first catalyst layer 20 (for example, the second catalyst layer 40 to be described below). Thus, "the formation amount of the catalyst layer per liter of the volume of the base material 11" refers to the total formation amount of the first catalyst layer 20 and another catalyst layer formed optionally per liter of the volume of the base material 11.

As illustrated in FIG. 3 and FIG. 4, in the particulate filter 10 according to this embodiment, the first catalyst layer 20 is provided in a region over 80% of the total length of the base material 11 from an end part of the base material 11 on the exhaust gas entry side toward an end part thereof on the exhaust gas exit side in order to increase the toxic gas purifying performance. Noted that the total length of the base material 11 refers to the distance between an end face of the base material where the inlet side cell 12 is open and an end face thereof where the exit side 14 is open, and corresponds to the dimension expressed by an arrow L in FIG. 4.

The first catalyst layer 20 may be formed up to the sealing part 12a of the inlet side cell 12 on the exhaust gas exit side, or may not be formed up to the sealing part 12a and the entry side surface 16a of the partition wall 16 may be exposed near the sealing part 12a. The first catalyst layer 20 is provided preferably in a region corresponding to 90% or more of the total length of the base material 11 from the end part of the base material 11 on the exhaust gas entry side toward the end part thereof on the exhaust gas exit side, and more preferably formed up to the sealing part 12a of the inlet side cell 12 on the exhaust gas exit side.

As illustrated in FIG. 4, in the particulate filter 10 according to this embodiment, in order to increase the pressure loss suppressing performance, the first catalyst layer is inclined so that the thickness thereof decreases from the end part on the exhaust gas entry side toward the end part on the exhaust gas exit side in at least a region from the position corresponding to 20% of the total length L of the base material to the position corresponding to 80% thereof, from the end part of the base material 11 on the exhaust gas entry side (in FIG. 4, the region in the range of 20% to 80%).

Here, in this specification, being inclined so that the thickness decreases means that, when the thicknesses of the catalyst layer at the positions corresponding to 20%, 40%, 60%, and 80% of the total length of the base material from the end part of the base material 11 on the exhaust gas entry side are D20, D40, D60, and D80, respectively, the relation of D20>D40>D60>D80 is satisfied and the ratio expressed by D20/D80 is 2 or more.

Note that D20, D40, D60, and D80 can be determined as follows.

(1) Scanning electron microscope (SEM) images of cross sections at the positions corresponding to 20%. 40%, 60%, and 80% of the total length of the base material from the end part of the base material 11 on the exhaust gas entry side are acquired.

(2) For each SEM image, the first catalyst layer 20 and the partition wall 16 are binarized using the two-dimensional image analysis software (product name: ImageJ (registered trademark)), so that the circumferential length of the inlet side cell 12 and the area of the catalyst layer in the inlet side cell 12 of the base material 11 are obtained.

(3) The area of the catalyst layer/the circumferential length of the inlet side cell 12 is used as the thickness of the catalyst layer.

(4) The thickness of the catalyst layer is obtained about four or more inlet side cells 12 and the average value thereof is calculated.

(5) The average values obtained from the SEM images at the positions corresponding to 20%, 40%, 60%, and 80% are used as D20, D40, D60, and D80, respectively:

In the conventional particulate filter, the thickness of the catalyst layer formed on the entry side surface of the base material is substantially uniform. Here, in the particulate filter, the PM is deposited on the upstream side first, and then, deposited on the downstream side. In the case where the thickness of the catalyst layer formed on the entry side surface of the base material is substantially uniform, after the PM is deposited on the upstream side, the exhaust gas concentrates and the pressure increases on the downstream side in the inlet side cell. Therefore, the exhaust gas entry speed of the PM into the partition wall on the downstream part increases and the PM reaches a deep layer part of the partition wall more easily. As a result, the deep layer deposition of the PM in the partition wall is promoted and the pressure loss of the particulate filter increases.

On the other hand, in this embodiment, the thickness of the first catalyst layer 20 in the downstream part of the inlet side cell 12 decreases. Therefore, the concentration and deposition of the PM on the upstream side occur less easily;

and additionally; on the downstream part side, the exhaust gas passes the partition wall 16 easily and the pressure of the exhaust gas decreases on the downstream side. As a result, the exhaust gas entry speed of the PM into the partition wall in the downstream part decreases, so that the deep layer deposition of the PM can be suppressed. Accordingly, the pressure loss of the particulate filter 10 can be reduced.

As one index of the inclination of the catalyst layer 20, the ratio expressed by D20/D80 above can be employed. When the ratio expressed by D20/D80 is too small, the pressure reducing effect on the downstream part side decreases, so that the pressure loss suppressing effect tends to be small. Therefore, the ratio expressed by D20/D80 as above is preferably 2.2 or more, more preferably 2.5 or more, and still more preferably 3 or more. On the other hand, when the ratio expressed by D20/D80 is too large, the pressure loss suppressing effect also tends to be small. Accordingly, the ratio expressed by D20/D80 above is preferably 4 or less, and more preferably 3.8 or less.

The thickness D80 of the catalyst layer at the position corresponding to 80% of the total length of the base material 11 from the end part of the base material 11 on the exhaust gas entry side is not limited in particular, but is preferably 11 μm or more and 25 μm or less, and more preferably 12 μm or more and 20 μm or less from the viewpoint of the higher pressure loss suppressing effect.

Note that the thickness of the first catalyst layer 20 to the position corresponding to 20% of the total length of the base material from the end part of the base material 11 on the exhaust gas entry side is not limited in particular, and the average thickness of this part is preferably D20×0.5 or more and more preferably D20 or more. Therefore, for example, the thickness of the first catalyst layer 20 to the position corresponding to 20% of the total length of the base material from the end part of the base material 11 on the exhaust gas entry side is constant, gradually decreases from the end part to the position corresponding to 20%, or gradually decreases after being kept constant to a predetermined position.

The thickness of the first catalyst layer 20 at the position over 80% of the total length of the base material 11 from the end part of the base material on the exhaust gas entry side is not limited in particular and the average thickness of this part is preferably D80 or less. Therefore, for example, thickness of the first catalyst layer 20 in a part over 80% of the total length of the base material 11 from the end part of the base material on the exhaust gas entry side is constant, gradually decreases, or gradually decreases to a predetermined position and then is kept constant.

In this embodiment, as described above, the first catalyst layer 20 is formed on the entry side surface 16a, which is the outer surface of the partition wall 16 of the base material 11. In the particulate filter 10 according to this embodiment, the base material 11 may include only the first catalyst layer 20 as the catalyst layer or may further include a catalyst layer in addition to the first catalyst layer 20. Preferably; the catalyst layer other than the first catalyst layer 20 is further formed inside the partition wall 16 of the base material 11.

3. Preferred Example of Optional Catalyst Layer

In a preferred example in the case where the catalyst layer is further formed inside the partition wall 16, for example, as illustrated in FIG. 5, the second catalyst layer 40 is formed on a wall surface of the pore 18 in a predetermined region from a surface of the partition wall 16 that is in contact with the outlet side cell 14 toward the inlet side cell 12, and a catalyst non-formation region 30 where the catalyst layer is not formed substantially is provided between the first catalyst layer 20 and the second catalyst layer 40 in the thickness direction of the partition wall 16.

In this preferred example, both the toxic gas purifying performance and the pressure loss suppressing performance can be achieved at the higher level. The preferred example is hereinafter described in detail.

[Catalyst Layer Non-Formation Region]

The catalyst non-formation region 30 is the region where the catalyst layer is not formed substantially: This catalyst non-formation region 30 is provided between the first catalyst layer 20 and a formation region 50 of the second catalyst layer 40 in the thickness direction Y of the partition wall 16. In other words, the catalyst non-formation region 30 is a region provided from the entry side surface 16a of the partition wall 16 toward the outlet side cell 14, where a wall surface 18a of the pore 18 is mostly exposed. As illustrated in FIG. 5, in the preferred example of the particulate filter 10 according to the present embodiment, the PM in the exhaust gas is mostly captured by the first catalyst layer 20. However, if the catalyst layer is formed on the wall surface of the pore 18, the pore becomes very narrow and even the deposition of a small amount of PM having passed the first catalyst layer 20 may close the pore 18. In contrast to this, in the preferred example, the catalyst non-formation region 30 where the catalyst layer is not formed is provided on the downstream side of the first catalyst layer 20. Thus, the arrival of the PM at the formation region 50 of the second catalyst layer 40 where the pore 18 is narrowed due to the catalyst layer can be prevented for sure.

In the present specification, "the catalyst layer is not formed substantially" means that the catalyst layer is not formed on the wall surface of the pore on purpose. Therefore, the case where a very small amount of catalyst layer exists in the region between the first catalyst layer 20 and the formation region 50 of the second catalyst layer 40 due to the error in manufacture, for example, is encompassed in the concept of "the catalyst layer is not formed substantially" in this specification. Note that whether the catalyst non-formation region is provided in the predetermined particulate filter (that is, whether the catalyst layer is formed on purpose in the region between a first catalyst region and a second catalyst region) can be determined in accordance with the procedure described in "4. determination of each region" below.

A dimension t2 of the catalyst non-formation region 30 in the thickness direction Y of the partition wall 16 is preferably 10 μm or more, more preferably 15 μm or more, and particularly preferably 20 μm or more. By this, the arrival of the PM having passed the first catalyst layer 20 at the second catalyst layer 40, which results in the increase in pressure loss, can be suppressed. On the other hand, the dimension of the catalyst non-formation region 30 in the thickness direction Y is preferably 100 μm or less, more preferably 90 μm or less, and particularly preferably 80 μm or less. By this, the region where the second catalyst layer 40 is formed can be secured and the toxic gas purifying performance can be exerted sufficiently.

[Second Catalyst Layer]

As illustrated in FIG. 5, the second catalyst layer 40 is a catalyst layer formed on the wall surface 18a of the pore 18 of the partition wall 16. That is to say, while the first catalyst layer 20 is the catalyst layer on the outer surface of the partition wall 18, the second catalyst layer 40 is the catalyst layer inside the partition wall 18 (that is, the catalyst layer on an internal surface of the partition wall 18). The component and the like usable for the second catalyst layer 40 may be those that are described as the component usable for the first catalyst layer 20.

The second catalyst layer 40 is provided in a predetermined region (region 50 in FIG. 5) from a surface (exit side surface 16b) of the partition wall 16 that is in contact with the outlet side cell 14 toward the inlet side cell 12.

In the conventional particulate filter including the catalyst layer inside the partition wall, generally, the catalyst layer is formed on the wall surface of the pore entirely in the thickness direction of the partition wall. In such a conventional particulate filter, the catalyst layer is formed on the wall surface of the pore, so that the pore is narrow. Accordingly, when a certain amount of exhaust gas is supplied and the PM is deposited in the pore, the pore is closed, in which case the pressure loss may suddenly increase. Additionally, since the catalyst layer is covered with the deposited PM, the contact frequency between the catalyst layer and the exhaust gas decreases, in which case the toxic gas purifying performance may decrease.

In contrast to this, as illustrated in FIG. 5, in this preferred example of the particulate filter 10 according to this embodiment, the catalyst non-formation region 30 exists below the first catalyst layer 20 and in the catalyst non-formation region 30, the pore 18 remains in the state of not being narrowed by the catalyst layer. Therefore, the first catalyst layer 20 and the catalyst non-formation region 30 can capture the PM (black circular dots in FIG. 5) sufficiently and the arrival of the PM at the formation region 50 of the second catalyst layer 40 in which the pore 18 is narrowed by the catalyst layer can be prevented. Accordingly; the closing of the pore 18 in the formation region 50 of the second catalyst layer 40, which results in the sudden increase in pressure loss, can be prevented. Additionally, in the preferred example, the second catalyst layer 40 is not covered with the PM easily. Therefore, the contact frequency between the second catalyst layer 40 and the exhaust gas can be secured sufficiently and the high toxic gas purifying performance can be exerted. As a result, in this preferred example, the region to capture the PM and the region to purify the toxic gas substances are separated and both the toxic gas purifying performance and the pressure loss suppressing performance can be achieved at the higher level.

The second catalyst layer 40 may have the same composition as the first catalyst layer 20 or have the composition different from that of the first catalyst layer 20. Preferably, the second catalyst layer 40 includes a three-way catalyst that oxides CO and HC and reduces $NO_x$ and a carrier that carries the three-way catalyst as well as the first catalyst layer 20.

The second catalyst layer 40 is preferably configured so as not to close the pore 18 and so as to sufficiently secure the contact frequency with the exhaust gas. From such a viewpoint, the second catalyst layer 40 is preferably configured by composite particles with smaller particle diameter than the pore 18 of the partition wall 16 similarly to the first catalyst layer 20. That is to say; the average particle diameter of the composite particles included in the second catalyst layer 40 is preferably 5 μm or less, more preferably 2.5 μm or less, still more preferably 2 μm or less, and is about 1 μm, for example although depending on the pore diameter of the partition wall 16 of the base material 10. By the use of such small particles, the closing of the pore 18 can be prevented and the contact frequency with the exhaust gas can be secured sufficiently. On the other hand, the lower limit value of the average particle diameter of the composite particles is not limited in particular and may be 0.01 μm or more, 0.05 μm or more, 0.1 μm or more, and 0.5 μm or more.

Noted that a dimension t3 of the formation region 50 of the second catalyst layer 40 in the thickness direction Y of the partition wall 16 can be determined based on the dimension t2 of the catalyst non-formation region 30. As described above, increasing the dimension t2 of the catalyst non-formation region 30 and decreasing the dimension t3 of the formation region 50 of the second catalyst layer 40 tend to improve the pressure loss suppressing performance. On the other hand, decreasing the dimension t2 of the catalyst non-formation region 30 and increasing the dimension t3 of the formation region 50 of the second catalyst layer 40 tend to improve the toxic gas purifying performance.

Although the range of the formation region 50 of the second catalyst layer 40 in the extending direction of the partition wall is not limited in particular, the range is preferably the range corresponding to 20% or more, more preferably 50% or more, and particularly preferably 70% or more of the total length of the base material 11 from the end part of the base material 11 on the exhaust gas entry side. In the rest part, the catalyst layer may be provided in the entire region in the thickness direction in the partition wall 16 or the catalyst non-formation region may be provided.

[Determination Procedure for Each Region]

The first catalyst layer 20, the formation region 50 of the second catalyst layer 40, and the catalyst non-formation region 30 in the preferred example described above are specified based on a determination procedure including the following (a) to (k). That is to say; whether the three regions of the first catalyst layer, the formation region of the second catalyst layer, and the catalyst non-formation region are provided in the predetermined particulate filter can be determined based on the following determination procedure.

(a) The particulate filter to be examined is deconstructed and ten sample pieces in each of which the partition wall of the base material is embedded in resin are prepared.

(b) The sample piece is ground to expose the cross section of the partition wall. The exposed cross section of the partition wall is observed with a scanning electron microscope (SEM) and a cross-sectional SEM observation image (reflection electron image with an observation magnification of 200 times) is obtained.

(c) The aforementioned cross-sectional SEM observation image is automatically binarized using two-dimensional image analysis software (for example, product name: ImageJ (registered trademark)), so that a binary image reflecting only the catalyst layer is obtained.

(d) By comparing the images before and after the automatic binarizing process, the catalyst layer recognized on the entry side surface of the partition wall is regarded as "the first catalyst layer".

(e) "The total number of pixels in the catalyst layer" and "the number of pixels in the entire binary image" that are recognized in the binary image are counted. "The total number of pixels in the catalyst layer" is divided by "the number of pixels in the entire binary image" and this quotient is used as "a catalyst layer presence ratio in the entire partition wall".

(f) An arbitrary region from the exit side surface of the partition wall toward the inlet side cell is set by comparing the images before and after the automatic binarizing process, "the number of pixels in the catalyst layer in the set region" is divided by "the total number of pixels in the set region" and this quotient is used as "a catalyst layer presence ratio in the set region".

(g) "The catalyst layer presence ratio in the set region" is divided by "the catalyst layer presence ratio in the entire partition wall" and whether this quotient is a first threshold or more is determined. Note that the first threshold in this process is set to, for example, 1.05 (preferably 1.1, more preferably 1.15, still more preferably 1.2, and particularly preferably 1.25).

(h) "The arbitrary region from the exit side surface of the partition wall toward the inlet side cell" described in the above (f) is expanded little by little toward the inlet side cell, and every time, "the catalyst layer presence ratio in the set region" is calculated. Then, "the catalyst layer presence ratio in the set region" is divided by "the catalyst layer presence ratio in the entire partition wall". The set region is expanded until the obtained quotient becomes lower than the first threshold.

(i) In the case where the region in which the quotient obtained from the result of the above process (h) is lower than the first threshold is recognized, the region in which the previous determination has been performed is regarded as "the formation region of the second catalyst layer". Then, a region between "the first catalyst layer" and "the formation region of the second catalyst layer" is used as "a third region".

(j) "The number of pixels in the catalyst layer in the third region" is divided by "the total number of pixels in the third region" and this quotient is used as "a catalyst layer presence ratio in the third region". Additionally, "the catalyst layer presence ratio in the third region" is divided by "the catalyst layer presence ratio in the entire image". When this quotient is a second threshold or less, it is determined that "the third region" is "the catalyst non-formation region" (that is to say; the catalyst non-formation region is provided between the first catalyst layer and the formation region of the second catalyst layer). The second threshold in this process is set to, for example, 0.65 (preferably 0.5, more preferably 0.4, still more preferably 0.3, and particularly preferably 0.25).

(k) The process of (b) to (j) is performed on all of the ten sample pieces. If the first catalyst layer, the formation region of the second catalyst layer, and the catalyst non-formation region are recognized in 50% or more of the sample pieces, it is determined that "the catalyst non-formation region is provided between the first catalyst layer and the formation region of the second catalyst layer" in the particulate filter to be examined.

Note that "the dimensions t1 to t3 of the respective regions in the thickness direction Y (see FIG. 5)" described above can be measured based on the border of the regions recognized in the aforementioned determination procedure. Specifically, each of "the dimensions t1 to t3 of the respective regions in the thickness direction Y" in this specification is the average value of the dimensions of the respective regions recognized in each of the ten sample pieces.

<Manufacturing Method for Particulate Filter>

The particulate filter 10 according to this embodiment can be manufactured based on the following procedure, for example.

1. Filling With Organic Solid Component

In this manufacturing method, first, the pores 18 of the partition wall 16 are filled with an organic solid component from the inlet side cell 12. Specifically, a pore filling slurry, in which the organic solid component is dispersed in a predetermined dispersion medium, is prepared and the pore filling slurry is introduced into the base material 11 from the inlet side cell 12. Then, suction is performed from the outlet side cell 14 of the base material 11, so that the pore filling slurry permeates into the pores 18. After that, a drying step is performed to remove the dispersion medium, so that the base material 11 including the pores 18 filled with the organic solid component is obtained. Note that any conventionally known material that is burned down in a firing step, which is described below, can be used as the organic solid component, without particular limitations. Examples of the organic solid component include resin beads mainly containing polyethylene, polypropylene, melamine resin, poly methyl methacrylate (PMMA) resin, or the like. As another example, resin fiber such as cellulose microfiber can be used. The size of the organic solid component is preferably adjusted so that the pores 18 of the partition wall 16 can be filled suitably. For example, in the case of using the resin beads as the organic solid component, the average particle diameter is preferably about 100 μm or less (more preferably 50 μm or less, and still more preferably 30 μm or less). As the dispersion medium, a liquid material that does not dissolve the organic solid component can be used without particular limitations. Examples of such a dispersion medium include water, alcohol, and the like. The concentration of the organic solid component in the pore filling slurry is preferably adjusted as appropriate in consideration of the porosity of the partition wall 16 of the base material 11 and the like.

2. Preparation of Catalyst Layer Formation Slurry

Next, a first catalyst layer formation slurry; which is a precursor material of the first catalyst layer 20, is prepared. Specifically, a mixed solution is prepared by mixing metal oxide, which is a carrier, and a compound, which is a supply source of a catalyst metal, at a predetermined ratio. Then, the prepared mixed solution is dried and then fired at predetermined temperature for a predetermined time, and thus, composite particles in which the catalyst metal is carried by the carrier are manufactured. These composite particles together with a desired additive (for example, OSC material) are mixed with a suitable solvent (for example, ion exchange water). Thus, the catalyst layer formation slurry is obtained, and an organic matter that is insoluble in a solvent (hereinafter also referred to as insoluble organic matter) is mixed so that the high shear viscosity of the first catalyst layer formation slurry increases in order for the first catalyst layer 20 to have the inclination. In the case of using water as the solvent, such an organic matter may be, for example, a cellulose that is insoluble in water. Note that an organic matter that is soluble in the solvent (hereinafter also referred to as soluble organic matter) may be further added thereto to increase the high shear viscosity: In the case of using water as the solvent, for example, a water-soluble cellulose or the like can be used as the soluble organic matter. Here, as the organic matter included in the first catalyst layer formation slurry has larger particle diameter, the high shear viscosity of the first catalyst layer formation slurry tends to increase. Therefore, when the organic matter that is soluble in the solvent is added to the first catalyst layer formation slurry; the first catalyst layer 20 can have the inclination, and the degree of the inclination of the first catalyst layer 20 can be adjusted by changing the mixing amount and the particle diameter of the insoluble organic matter. Note that since the detailed description of the catalyst metal, the carrier, and other additives is already made, the overlapping description is omitted.

3. Formation of First Catalyst Layer

In this process, the first catalyst layer formation slurry is applied on the entry side surface 16a of the partition wall 16, and then dried and fired: thus, the catalyst layer 20 is formed on the entry side surface 16a of the partition wall 16 and the first catalyst layer 20 is thereby formed. Specifically, after the catalyst layer formation slurry is supplied to the inlet side cell 12 of the base material 11, suction is performed from the outlet side cell 14. At this time, since the pore 18 of the partition wall 16 is filled with the organic solid component, the slurry does not permeate into the partition wall 16 and attaches to the entry side surface 16a. By performing the drying process and the firing process in this state, the first catalyst layer 20 in which the catalyst layer 20 is formed on the entry side surface 16a of the partition wall 16 is formed. In this firing process, the organic solid component is burned down so that the pore 18 is not closed anymore. Additionally, in this firing process, the organic matter that is insoluble in the solvent is burned down. From the viewpoint of burning down the organic solid component and the organic matter that is insoluble in the solvent for sure, the temperature of the firing process is preferably 400° C. or more, more preferably 500° C. or more, and still more preferably 600° C. or more. Similarly, in order to surely burn down the organic solid component and the organic matter that is insoluble in the solvent, the firing time is preferably about 2 to 4 hours. The condition of the drying process is not limited in particular and can be adjusted as appropriate so that the first catalyst layer formation slurry is dried suitably: Note that the degree of the inclination of the first catalyst layer 20 can be adjusted also in accordance with the suction condition when the suction is performed from the outlet side cell 14 after the catalyst layer formation slurry is supplied to the inlet side cell 12 of the base material 11. Note that in the case where the insoluble organic matter and the soluble organic matter are mixed in the first catalyst layer formation slurry; the insoluble organic matter and the soluble organic matter are burned down in this firing process.

4. Formation of Second Catalyst Layer

In this process, first, a second catalyst layer formation slurry permeates into the partition wall 16 from the exit side surface 16b of the partition wall 16, so that the second catalyst layer formation slurry attaches to the wall surface 18a of the pore 18. Specifically; the catalyst layer formation slurry is supplied into the outlet side cell 14 of the base material 11 and suction is performed from the inlet side cell 12. In this process, the region to which the slurry permeates is controlled so that the slurry will not permeate up to the entry side surface 16a of the partition wall 16. Note that the permeation of the slurry in this process is affected by a number of conditions including the amount of supplied slurry; the viscosity of the slurry; the particle diameter of the component of the slurry (composite particle, additive, or the like), the porosity of the partition wall of the base material, the pressure at the suction, the suction time, and the like. Therefore, it is preferable to conduct a preliminary test in which any of these conditions is changed as appropriate and based on the knowledge obtained from the test, control the region to which the slurry permeates. Note that the second catalyst layer formation slurry used in this process may be the same as or different from the first catalyst layer formation slurry.

Next, in this process, the drying step and the firing step are performed. Thus, the second catalyst layer 40 is formed in the region to which the second catalyst layer formation slurry permeates. Then, the region to which the second catalyst layer formation slurry does not permeate becomes the catalyst non-formation region 30 where neither the first catalyst layer 20 nor the second catalyst layer 40 is formed substantially (the partition wall 18a of the pore 18 is exposed). Noted that in this process, the firing temperature is preferably 400° C. or more, more preferably 500° C. or more, and still more preferably 600° C. or more, similarly to when the first catalyst layer 20 described above is formed. Moreover, the firing time is preferably about 2 to 4 hours. Thus, the organic matter that is insoluble in the solvent and the organic solid component remaining in the pores 18 can be removed for sure.

In this manner, the particulate filter 10 according to this embodiment can be manufactured. The manufacturing method described above is one example of means for manufacturing the particulate filter 10 according to this embodiment and is not intended to limit the particulate filter disclosed herein.

<Application of Particulate Filter>

The particulate filter 10 according to one embodiment of the present invention can be used as a gasoline particulate filter (GPF), a diesel particulate filter (DPF), or the like, and is preferably the GPF.

Test Example

Test examples about the present invention are hereinafter described but it is not intended to limit the present invention to these test examples.

1. Manufacture of Test Samples

Examples 1 and 2, and Comparative Examples 1 to 3

First, as a base material A, a cylindrical honeycomb base material with a base material volume of 1.4 L and a length of 101.6 mm was prepared.

Next, a pore filling slurry in which resin beads (polyethylene) with an average particle diameter of 1 μm were dispersed in ion exchange water was prepared. After this pore filling slurry was supplied into the inlet side cell of the honeycomb base material, the outlet side cell was sucked, so that the pore filling slurry permeated into the pores. Then, by performing the drying process (100° C., 30 minutes), the honeycomb base material in which the pores of the partition wall were filled with the resin beads was obtained.

Next, a rhodium nitrate solution (Rh content: 0.2 g) and powder (40 g) of needle-shaped $Al_2O_3$ ($\gamma$-$Al_2O_3$) as a carrier were mixed with a suitable amount of ion exchange water, and this mixture was dried and then fired (500° C., one hour); thus, composite particles carrying the catalyst (Rh-carrying $Al_2O_3$ powder) were obtained. Such Rh-carrying $Al_2O_3$ powder and an OSC material (ceria-zirconia composite oxide) were mixed at a ratio of 1:1, and cellulose powder A (particle diameter 25 μm) that is insoluble in water was added thereto in an amount shown in Table 1 (solid content), and the mixture was dispersed uniformly to prepare a catalyst layer formation slurry. Then, the catalyst layer formation slurry was supplied into the inlet side cell of the honeycomb base material in the coating amount shown in Table 1 and after that, the outlet side cell was sucked; thus, the catalyst layer formation slurry was applied to the entry side surface of the partition wall. Next, the drying process (100° C., 30 minutes) and the firing process (600° C., 120 minutes) were performed; thus, the resin beads were burned down and at the same time, the catalyst layer was formed.

Then, the catalyst layer formation slurry in a coating amount of 30 g/L thereof per liter of the base material was supplied into the outlet side cell of the honeycomb base material, and after that, the inlet side cell was sucked; thus, the slurry permeated toward the inlet side cell from the exit side surface of the partition wall. At this time, the coat width was 45% of the total length of the base material. Next, the drying process (100° C., 30 minutes) and the firing process (500° C., 60 minutes) were performed; thus, the catalyst layer was formed on the wall surface of the pore inside the partition wall. In this manner, the particulate filters according to Examples 1 and 2 and Comparative Examples 1 to 3 were obtained.

Examples 3 and 4, and Comparative Examples 4 to 6

First, as a base material B, a cylindrical honeycomb base material with a base material volume of 1.3 L and a length of 114.3 mm was prepared.

Next, a pore filling slurry in which resin beads (polyethylene) with an average particle diameter of 1 μm were dispersed in ion exchange water was prepared. After this pore filling slurry was supplied into the inlet side cell of the honeycomb base material, the outlet side cell was sucked, so that the pore filling slurry permeated into the pores. Then, by performing the drying process (100° C., 30 minutes), the honeycomb base material in which the pores of the partition wall were filled with the resin beads was obtained.

Next, a rhodium nitrate solution (Rh content: 0.2 g) and powder (40 g) of needle-shaped $Al_2O_3$ ($\gamma$-$Al_2O_3$) as a carrier were mixed with a suitable amount of ion exchange water, and this mixture was dried and then fired (500° C., one hour); thus, composite particles carrying the catalyst (Rh-carrying $Al_2O_3$ powder) were obtained. Such Rh-carrying $Al_2O_3$ powder h and an OSC material (ceria-zirconia composite oxide) were mixed at a ratio of 1:1, cellulose powder A (particle diameter 25 μm) that is insoluble in water and cellulose powder B (particle diameter 6 μm) that is insoluble in water were further added thereto in an amount shown in Table 1 (solid content), and the mixture was dispersed uniformly to prepare a catalyst layer formation slurry. Then, the catalyst layer formation slurry was supplied into the inlet side cell of the honeycomb base material in the coating amount shown in Table 1 and after that, the outlet side cell was sucked; thus, the catalyst layer formation slurry was applied to the entry side surface of the partition wall. Next, the drying process (100° C., 30 minutes) and the firing process (600° C., 120 minutes) were performed; thus, the resin beads were burned down and at the same time, the first catalyst layer was formed.

Then, the catalyst layer formation slurry was supplied into the outlet side cell of the honeycomb base material in the coating amount shown in Table 1 and after that, the inlet side cell was sucked; thus, the slurry permeated toward the inlet side cell from the exit side surface of the partition wall. Next, the drying process (100° C., 30 minutes) and the firing process (500° C., 60 minutes) were performed; thus, the second catalyst layer was formed on the wall surface of the pore inside the partition wall. In this manner, the particulate filters according to Examples 3 and 4 and Comparative Examples 4 to 6 were obtained.

2. Evaluation Tests (1) Measurement of Thickness of First Catalyst Layer

Figure 6:
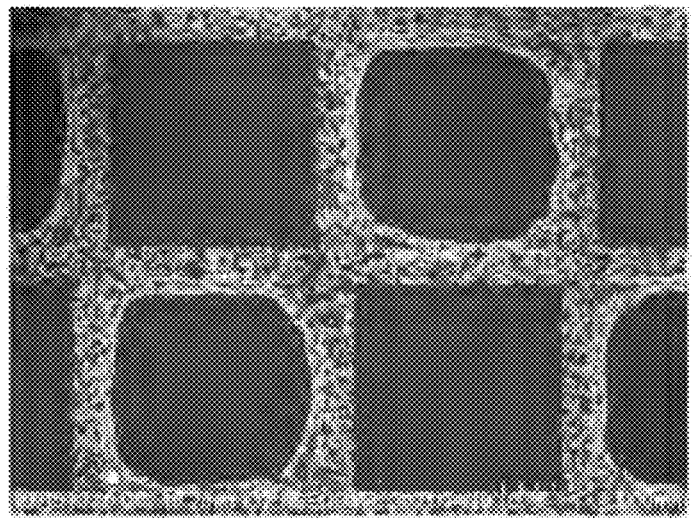
FIG. 6 is a cross-sectional SEM image of a particulate filter in Example 1 at a position corresponding to 20% of the total length of the base material from an end part of the base material on an exhaust gas entry side.
Figure 7:
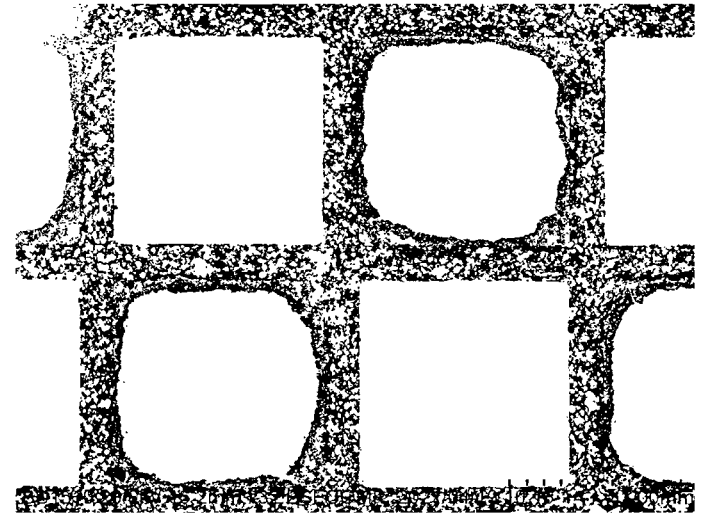
FIG. 7 is a binarized image of the SEM image of FIG. 6.

Regarding the particulate filters according to Examples and Comparative Examples, cross-sectional samples at the positions corresponding to 20%, 40%, 60%, and 80% of the total length of the base material from the end part of the base material on the exhaust gas entry side were manufactured by an embedding method using epoxy resin. The SEM images of these cross sections were acquired and binarized using the image analysis software (product name: ImageJ (registered trademark)). From the binarized image, the area ($\mu m^2$) of the catalyst layer in the inlet side cell of the base material and the circumferential length (μm) of the inlet side cell were obtained and the thickness (μm) of the catalyst layer was calculated from the area (μm²) of the catalyst layer/the circumferential length (μm) of the inlet side cell=the thickness (μm) of the catalyst layer. For the four inlet side cells, the thickness (μm) of the catalyst layer was obtained and the average value thereof was calculated. The average values obtained from the SEM images at the positions corresponding to 20%, 40%, 60%, and 80% were defined as D20, D40, D60, and D80, respectively. The results are shown in Table 1. As a reference, FIG. 6 and FIG. 7 respectively show the SEM image and the binarized image of the cross section of the particulate filter according to Example 1 at the position corresponding to 20% of the total length of the base material from the end part of the base material on the exhaust gas entry side.

Figure 8:
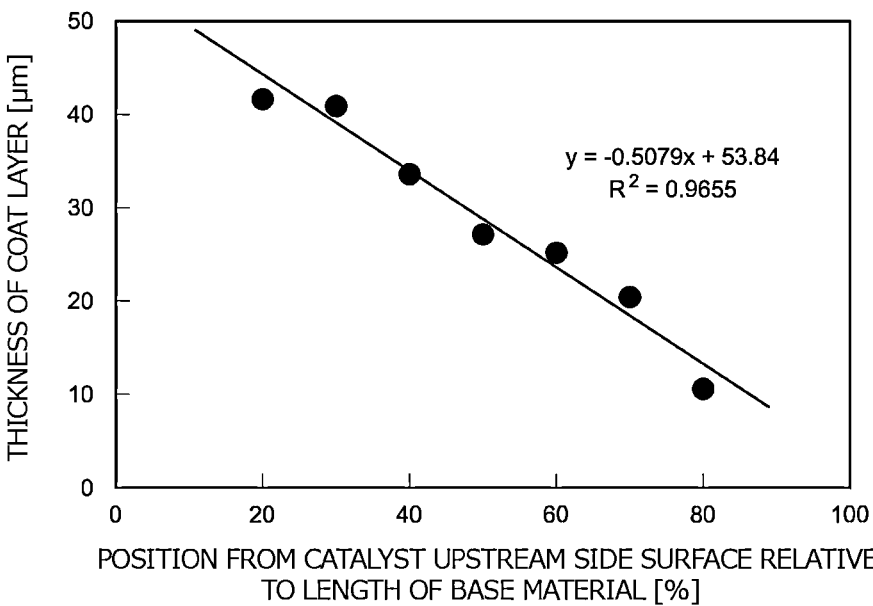
FIG. 8 is a graph expressing the thicknesses of a catalyst layer in the particulate filter in Example 1 at positions corresponding to 20% to 80% of the total length of the base material from the end part of the base material on the exhaust gas entry side.

Additionally, the ratio expressed by D20/D80 was determined as the index of the inclination of the catalyst layer. The results are shown in Table 1. Regarding the particulate filter according to Example 1, the thicknesses of the catalyst layer at the positions corresponding to 30%, 50%, and 70% of the total length of the base material from the end part of the base material on the exhaust gas entry side were obtained in the same manner as described above. The results are shown in FIG. 8.

(2) Measurement of Pressure Loss

The particulate filter in each of Examples and Comparative Examples was installed in a diesel particulate generator (DPG, product of Cambustion Ltd.) and by burning light oil, gas containing soot was supplied to the particulate filter. Then, the pressure in the pipe on the upstream side of the particulate filter and the pressure in the pipe on the downstream side were measured and based on these pressures, the pressure loss (kPa) was calculated. In this test, the pressure loss when the deposition amount of PM in the catalyst layer became 1 g/L was used as "PM deposition pressure loss". The results are shown in Table 1.

part on the exhaust gas entry side toward the end part on the exhaust gas exit side. Linear approximation with the expression shown in FIG. 8 is possible and thus, it can be understood that the first catalyst layer is inclined.

Since D20, D60, D40, and D80 are the positive values, it can be understood that the first catalyst layer is provided in the region over 80% of the total length of the base material from the end part of the base material on the exhaust gas entry side toward the end part thereof on the exhaust gas exit side in each of Examples and Comparative Examples. Moreover, as shown by the results in Table 1, it can be understood that the particulate filter in each of Examples satisfies D20>D40>D60>D80 and the ratio of D20/D80 is 2 or more.

On the other hand, in each of Comparative Examples, the ratio of D20/D80 was less than 2 and in particular, the ratio of D20/D80 was 1.1 in Comparative Example 2, which is the test example using the conventional catalyst layer formation slurry without using the cellulose powder that is insoluble in water.

The comparison between Examples 1 and 2 and Comparative Examples 1 to 3 and the comparison between Examples 3 and 4 and Comparative Examples 4 to 6 indicate that the pressure loss decreases in the particulate filter in each of Examples. Therefore, it can be understood that in the particulate filter disclosed herein, although the catalyst layer is formed in the region over 80% of the total length of the base material, the pressure loss can be suppressed.

Although specific examples of the present invention have been described in detail above, they are merely examples and do not limit the scope of the claims. The techniques described in the scope of claims include those in which the specific examples exemplified above are variously modified and changed.

INDUSTRIAL APPLICABILITY

According to the present invention, the wall-flow type particulate filter in which the pressure loss is suppressed

TABLE 1

| | Base material | Coating amount (g/L) | Amount of added cellulose powder (wt %) | | | Thickness of first catalyst layer (μm) | | | | D20/ D80 | Deposition pressure loss (mbar) |
| | | | Total | Powder A | Powder B | D20 | D40 | D60 | D80 | | |
|---|---|---|---|---|---|---|---|---|---|---|---|
| Example 1 | A | 50 | 30 | 30 | 0 | 41.3 | 33.8 | 26 | 18.5 | 2.2 | 83.6 |
| Example 2 | A | 60 | 30 | 30 | 0 | 47.2 | 39.3 | 31.1 | 23 | 2.1 | 86.2 |
| Comparative Example 1 | A | 50 | 10 | 10 | 0 | 20.3 | 20.1 | 19.7 | 19.3 | 1 | 109.1 |
| Comparative Example 2 | A | 60 | 0 | 0 | 0 | 21.2 | 20.5 | 20.1 | 19.8 | 1.1 | 114.3 |
| Comparative Example 3 | A | 60 | 10 | 10 | 0 | 36.7 | 33.2 | 26.9 | 22.2 | 1.7 | 111.9 |
| Example 3 | B | 50 | 10 | 10 | 0 | 46 | 30.4 | 20.7 | 13.7 | 3.4 | 71.5 |
| Example 4 | B | 50 | 10 | 6.7 | 3.3 | 44.3 | 39.7 | 24.5 | 16.9 | 2.6 | 72.4 |
| Comparative Example 4 | B | 50 | 10 | 5 | 5 | 28.8 | 25.9 | 22.6 | 20.7 | 1.4 | 75.4 |
| Comparative Example 5 | B | 50 | 10 | 3.3 | 6.7 | 34 | 29.8 | 22.4 | 18.3 | 1.9 | 74 |
| Comparative Example 6 | B | 50 | 10 | 0 | 10 | 13.7 | 13.9 | 14.5 | 14.9 | 0.9 | 74.9 |

As the graph in FIG. 8 indicates, in the particulate filter according to Example 1, in the region from the position corresponding to 20% of the total length of the base material to the position corresponding to 80%, from the end part of the base material on the exhaust gas entry side, the thickness of the first catalyst layer gradually decreases from the end despite the large formation region of the catalyst layer can be provided. By such a particulate filter, the exhaust gas emitted from the internal-combustion engine such as an engine for automobiles can be suitably purified without decreasing the performance of the internal-combustion engine.

The invention claimed is:

1. A particulate filter comprising a wall-flow type base material and a catalyst layer formed on the base material, wherein the base material includes an inlet side cell whose only end part on an exhaust gas entry side is open, an outlet side cell whose only end part on an exhaust gas exit side is open, and a partition wall that sections between the inlet side cell and the outlet side cell and includes a plurality of pores communicating between the inlet side cell and the outlet side cell, a first catalyst layer is formed on a surface of the partition wall that is in contact with the inlet side cell, the first catalyst layer is provided in a region over 80% of a total length of the base material from an end part of the base material on the exhaust gas entry side toward an end part thereof on the exhaust gas exit side, in at least a region from a position corresponding to 20% of the total length of the base material to a position corresponding to 80% thereof, from the end part of the base material on the exhaust gas entry side, the first catalyst layer is inclined so that a thickness of the first catalyst layer decreases from the end part on the exhaust gas entry side toward the end part on the exhaust gas exit side, a second catalyst layer is formed on a wall surface of the pore in a predetermined region from a surface of the partition wall that is in contact with the outlet side cell toward the inlet side cell, and a catalyst non-formation region where the catalyst layer is not formed substantially is provided between the first catalyst layer and a formation region of the second catalyst layer in a thickness direction of the partition wall.

2. The particulate filter according to claim 1, wherein a ratio (D20/D80) of a thickness (D20) of the first catalyst layer at the position corresponding to 20% of the total length of the base material from the end part of the base material on the exhaust gas entry side to a thickness (D80) of the catalyst layer at the position corresponding to 80% of the total length of the base material from the end part of the base material on the exhaust gas entry side is 2 or more and 4 or less.

3. The particulate filter according to claim 1, wherein the thickness (D80) of the first catalyst layer at the position corresponding to 80% of the total length of the base material from the end part of the base material on the exhaust gas entry side is 11 µm or more and 25 µm or less.

4. The particulate filter according to claim 1, wherein the first and second catalyst layers contain a three-way catalyst that oxidizes CO and HC and reduces NOx, and a carrier that carries the three-way catalyst.

5. The particulate filter according to claim 4, wherein the three-way catalyst contains at least one kind selected from the group consisting of Pt, Pd, and Rh.

* * * * *